(12) United States Patent
Costaglia

(10) Patent No.: US 12,527,412 B2
(45) Date of Patent: Jan. 20, 2026

(54) SUPPORT ELEMENT FOR A CHAIR

(71) Applicant: REXSITT ITALIA S.R.L., Bertinoro (IT)

(72) Inventor: Massimo Costaglia, Santa Giustina in Colle (IT)

(73) Assignee: REXSITT ITALIA S.R.L., Bertinoro (IT)

( * ) Notice: Subject to any disclaimer, the term of this patent is extended or adjusted under 35 U.S.C. 154(b) by 115 days.

(21) Appl. No.: 18/607,475

(22) Filed: Mar. 17, 2024

(65) Prior Publication Data
US 2024/0324789 A1    Oct. 3, 2024

(30) Foreign Application Priority Data

Mar. 31, 2023   (IT) .......................... 102023000006429

(51) Int. Cl.
*A47C 31/11*      (2006.01)
*B68G 7/12*       (2006.01)

(52) U.S. Cl.
CPC .................................... *A47C 31/11* (2013.01)

(58) Field of Classification Search
CPC ......... B60N 2/7041; B68G 7/12; A47C 31/11; A47C 31/02; A47C 31/04
See application file for complete search history.

(56) References Cited

U.S. PATENT DOCUMENTS

| | | | |
|---|---|---|---|
| 3,114,577 A * | 12/1963 | Propst ...................... | A47C 3/28 297/451.1 |
| 4,712,834 A * | 12/1987 | Warrick .................. | B64D 11/06 297/216.17 |
| 6,890,030 B2 * | 5/2005 | Wilkerson ............. | A47C 1/023 297/316 |
| 7,367,629 B2 | 5/2008 | Kepler et al. | |
| 7,517,024 B2 * | 4/2009 | Cvek ...................... | A47C 7/282 297/284.6 |
| 10,773,620 B2 * | 9/2020 | Strong ................. | B60N 2/6027 |

FOREIGN PATENT DOCUMENTS

| | | | | |
|---|---|---|---|---|
| JP | S55104955 U | | 7/1980 | |
| WO | WO-2004016462 A1 | * | 2/2004 | ........... B60N 2/5883 |
| WO | WO-2019158329 A1 | * | 8/2019 | ............. B60N 2/929 |

OTHER PUBLICATIONS

European Search Report for EP24167552 Mailed on May 1, 2024.
Italian Search Report for IT202300006429 Mailed on Sep. 22, 2023.

* cited by examiner

*Primary Examiner* — Brian M O'Hara
(74) *Attorney, Agent, or Firm* — Rivka Friedman

(57) ABSTRACT

Support element for a chair, which comprises a support body provided with an upper face and with an opposite lower face, and a covering element placed to cover the upper face of the support body. The support element also comprises a tensioning element engaged with a perimeter portion of the covering element and provided with a grip portion, which is susceptible of being stretched in order to tighten the covering element and is constrained to the support body in order to maintain the covering element taut on the support body. The support element also comprises a guide element which is fixed to the lower face of the support body, and a traction element which is mechanically connected to the grip portion of the tensioning element and is slidably engaged in the guide element, in order to tighten the covering element among multiple tensioning positions.

10 Claims, 11 Drawing Sheets

SUPPORT ELEMENT FOR A CHAIR

FIELD OF APPLICATION

The present invention regards a support element for a chair.

The present support element for a chair is intended to be employed for allowing the support and/or the sitting of a user, both for example in offices, studies and the like (in particular during working hours) and in private homes, for example in respective studies, kitchens or living rooms.

The support element for a chair according to the invention is therefore inserted in the furnishing field, both work and home environments, and more generally in the field of production of furniture, in particular of production of chairs or parts of chairs.

STATE OF THE ART

The chairs of known type can be attained in a single body, for example made of plastic or metal, and therefore provide for a support structure and a seat for supporting a user in seated position. Such chairs have proven to be uncomfortable to use for a prolonged time period, both in work and home environment, due to the high rigidity of the seat on which the user rests during use.

For such purpose, ergonomic chairs have been developed, which have a padded seat (usually made of expanded polyurethane) in order to allow creating a softer abutment surface for the user and thus to improve the comfort of the seat.

Such chairs of known type comprise a support base, for example provided with fixed abutment legs or with a base provided with wheels in order to allow the chair to be moved on the floor, and a seat mounted on the support base, on which a user can be seated during the normal use of the chair. The seat comprises in particular a rigid support, fixed to the support base of the chair, and a covering element (for example made of fabric or leather) which is placed to cover the rigid support.

In this manner, the covering element provides a seat surface to the user and simultaneously improves the exterior appearance of the seat.

The seat also usually comprises a padding layer (usually made of elastic foam, for example made of expanded polyurethane), which is placed between the support body and the covering element, in order to render more comfortable the sitting of a user. The padding layer is sometimes shaped with a swelling at its upper surface (on which the covering element is placed), which is elastically pliable, rendering more comfortable the sitting of the user, and contributing to maintain the covering element under tension.

In the chairs of prior art, the covering element of the seat is taut around the padding layer and fixed to the rigid support by means of nails or metal points, in order to ensure the fixing of the covering element under tension, wound around the rigid support.

Such operation is usually carried out by hand, by a specialized operator, who places the seat head down and manually (locally) tightens the covering element in order to then locally fix it by means of the aforesaid fixing means, repeating such operation numerous times up to fixing the covering element along the entire perimeter edge thereof.

However, the above-described chairs of known have in practice shown that they do no lack drawbacks.

The main drawback is that such fixing operation requires high time for its execution, and also requires being carried out by a specialized operator, in order to ensure that the covering fabric is taut in a uniform manner over the entire seat and thus preventing the formation of fabric remnants due to less tensioned zones.

A further drawback lies in the fact that the covering element, following the prolonged use of the chair, tends to be worn and/or to decrease its level of tensioning. In order to remedy the wear of the covering element, it is necessary to substitute the latter with a new covering. However, the substitution of the covering element requires the necessary removal of the fixing means that fix the covering element to the support body of the seat, resulting in an inconvenient and laborious procedure.

In order to remedy such drawback, chairs have been developed in which the covering fabrics are provided with twine, placed perimetrically, which can be pulled by an operator in order to simultaneously tighten the entire fabric around the support of the seat. This allows considerably reducing the work times for covering the seat of the chair, since it will suffice for the operator to act on the twine, tensioning the fabric, and subsequently proceeding with the fixing of the latter.

The fixing in particular occurs with conventional methods, also in such case by means of the use of nails or metal points, but without having to locally tension the fabric as in the preceding chairs.

However, even the chairs of known type described above have in practice shown that they do not lack drawbacks.

The main drawback is that also such fixing operation requires considerable time for its execution, since it requires carrying out the same operation of fixing of the fabric on the rigid support by means of nails or metal points.

A further drawback lies in the fact that the seat of the chairs of known type cannot be substituted or modified with regard to its single components.

More in detail, once the seat is assembled, it is impossible to substitute the covering element, for example due to its wear or simply for the need to modify the use destination of the chair.

Indeed, in the chairs of known type, the substitution of the covering fabric of the seat requires removing each nail or metal point in order to proceed with its separation from the rigid support, and then provide for its new fixing, once substituted.

A further drawback lies in the fact that the seat of the chairs of known type cannot be tensioned again following its fixing.

Such need may in particular arise in the event in which the covering fabric is loosened or becomes creased over time, resulting in it being less taut than it was at the start.

A further drawback lies in the fact that the seat of the chairs of known type cannot be recycled in an efficient manner, since it does not allow (if not in a very complicated and laborious manner) the separation of the single elements that compose the seat.

A further drawback lies in the fact that also the mounting of the seat of such chair of known type requires the presence of a specialized operator.

In particular, the aforesaid mounting requires a particular sensitivity of the operator, who must very that, during the tensioning of the twine, the covering fabric is not moved with respect to the padding layer, causing a non-optimal alignment of the seat components.

Chairs are also known which provide for tensioning devices that are connected to the twine, or to the fabric, and which can be moved in order to tighten the fabric of the chair. For example, the document U.S. Pat. No. 7,367,629 describes an automobile seat which is provided with a tensioning device that comprises a retention body, which is fixed to the frame of the seat and is provided with an engagement seat, and with a traction element, which is connected to the fabric of the seat and is couplable in the engagement seat of the retention body, in order to constrain the traction element in position once the fabric of the seat has been tensioned.

In addition, known from the documents WO 2004/016462 and JP S55104955 are tensioning devices that comprise one or more retention pins, at one of whose ends the twine of the seat is connected, which is rotatable by the user in order to retrieve the twine and tension the fabric of the seat.

In particular, the document JP S55104955 provides that the twine be wound directly around the retention pin, while the document WO 2004/016462 provides that the pin be screwed on a nut screw element, so as to determine the tensioning of the fabric as the retention pin is screwed on the nut screw element.

Nevertheless, also the tensioning devices of known type described above have shown in practice that they lack drawbacks.

In particular, such tensioning devices of known type have proven inconvenient and laborious to be used by a user, since they are complicated to actuate.

In addition, such devices of known type take a long time to carry out the desired tensioning of the fabric, and also to allow the reduction of the tensioning in case of need by the user.

Presentation of the Invention

In this situation, the problem underlying the present invention is therefore that of overcoming the drawbacks exposed by providing a support element for a chair which allows mounting the covering element in a simple manner, without having to turn to specialized personnel.

A further object of the present invention is to provide a support element for a chair which allows a quick and easy adjustment of the tensioning of the covering element.

A further object of the present invention is to provide a support element for a chair which allows tensioning again, over time, a covering element of the support element.

A further object of the present invention is to provide a support element for a chair which allows an easy substitution of the covering element.

A further object of the present invention is to provide a support element for a chair which is easily for all the components thereof.

A further object of the present invention is to provide a support element for a chair which is simple and inexpensive to attain.

BRIEF DESCRIPTION OF THE DRAWINGS

The technical characteristics of the invention, according to the aforesaid objects, and the advantages thereof, will be more evident from the following detailed description, made with reference to the enclosed drawings, which represent a merely exemplifying and non-limiting embodiment of the invention, in which.

DETAILED DESCRIPTION OF A PREFERRED EMBODIMENT

Figure 1:
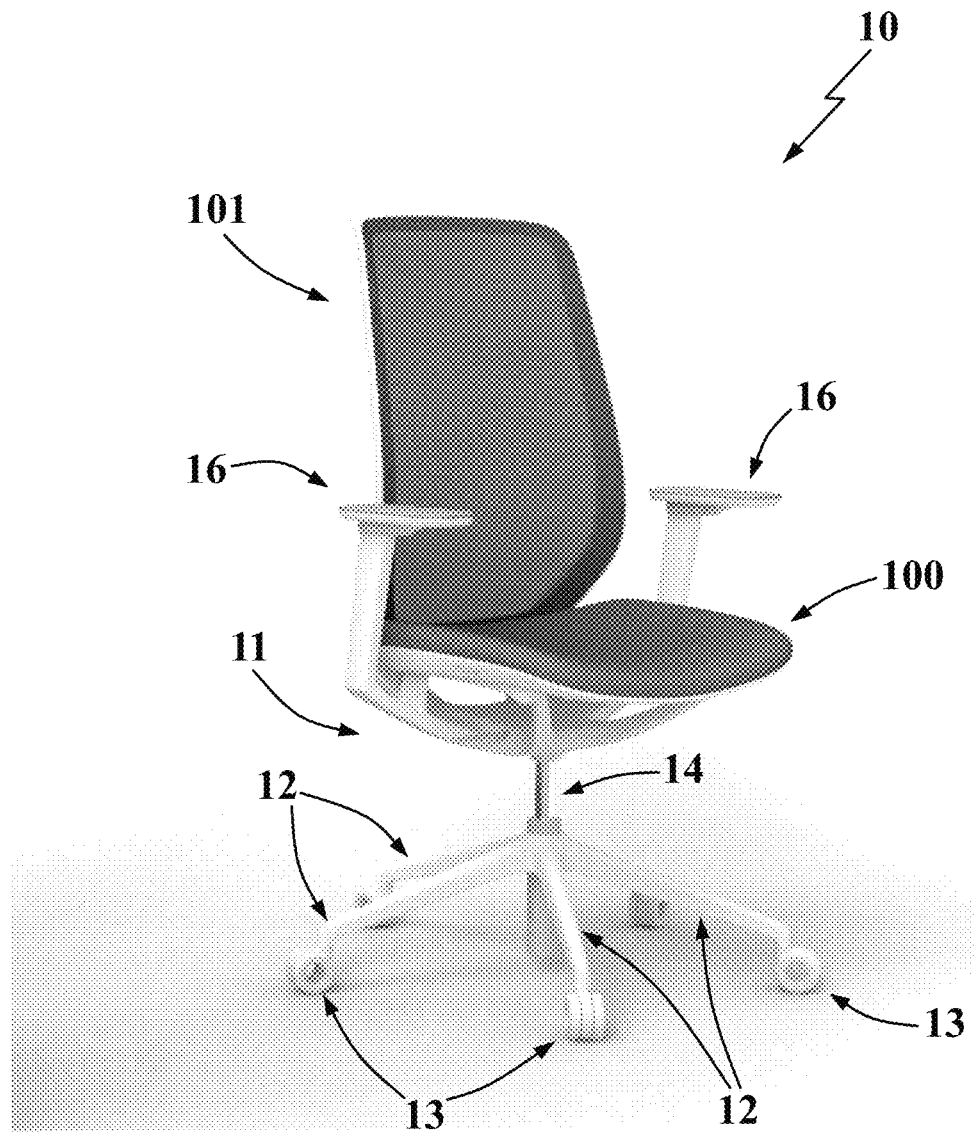
FIG. 1 shows a chair for the seating of a user on which a support element is mounted, object of the present invention.
Figure 2:
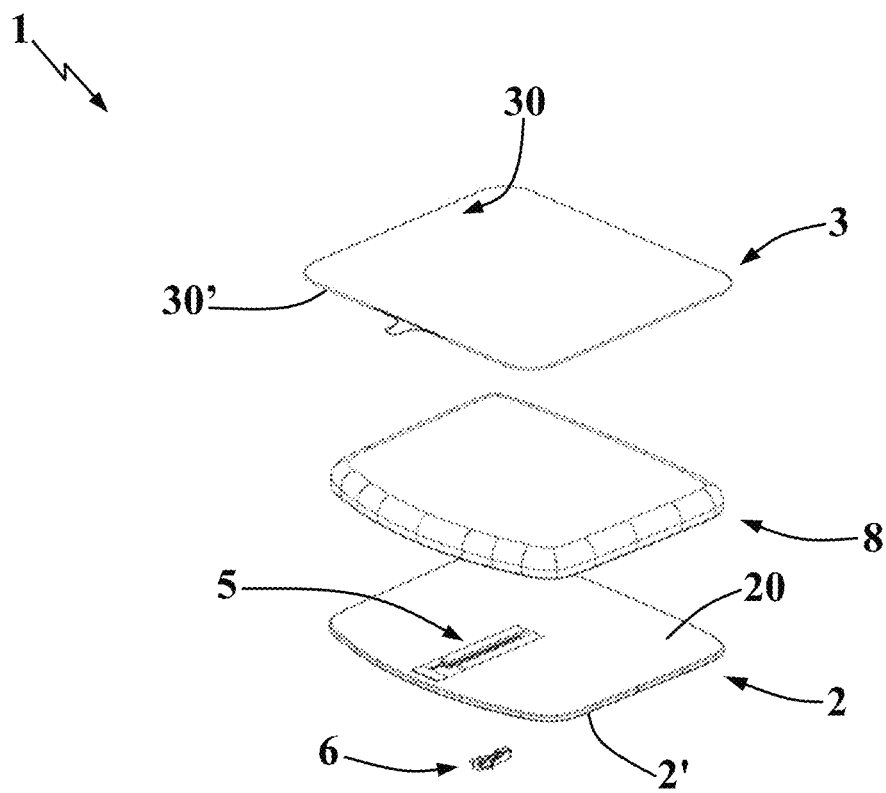
FIG. 2 shows an exploded view of a support element, object of the present invention.
Figure 3:
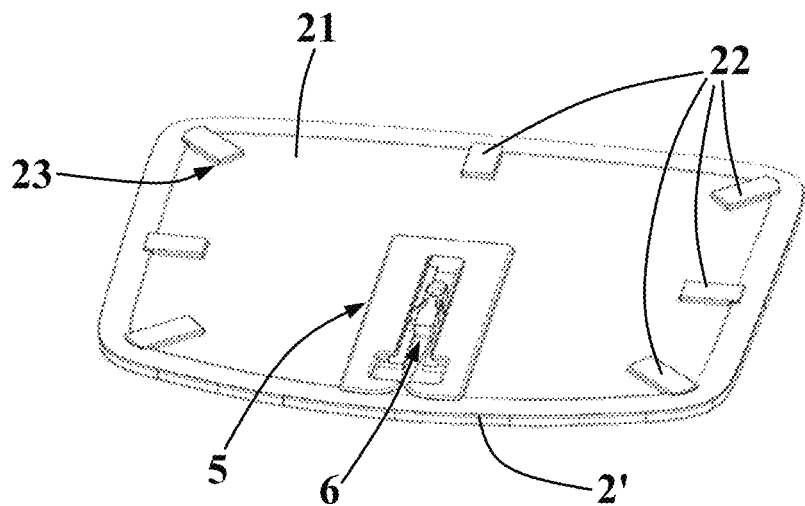
FIG. 3 shows a lower perspective view of the support element of FIG. 2.
Figure 4:
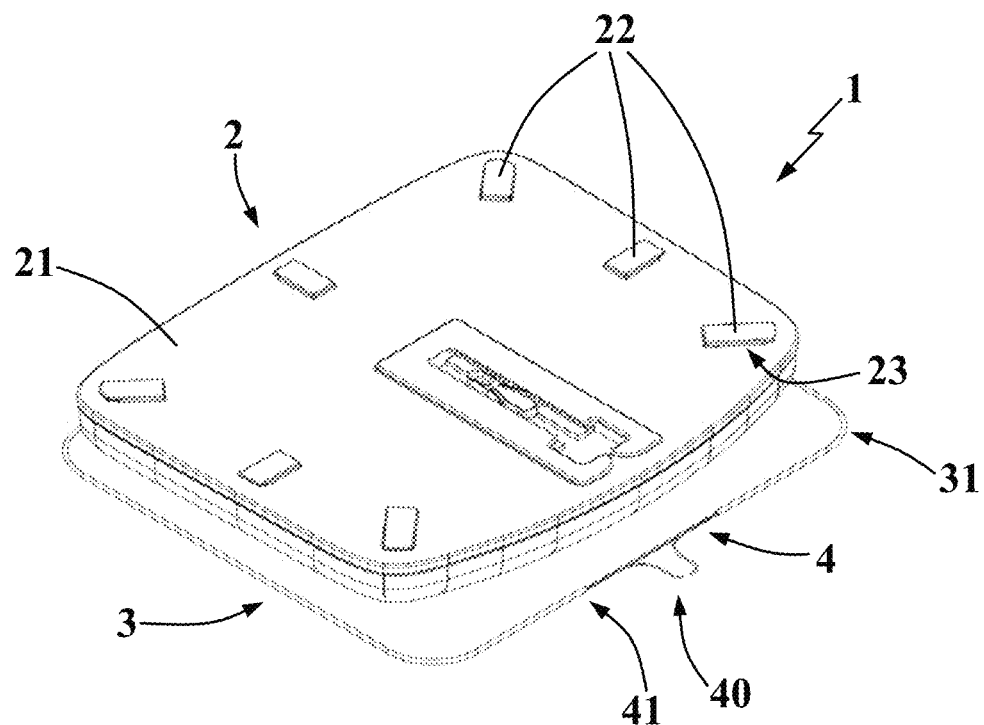
FIG. 4 shows a lower partially exploded view of the support element of FIG. 2.
Figure 5:
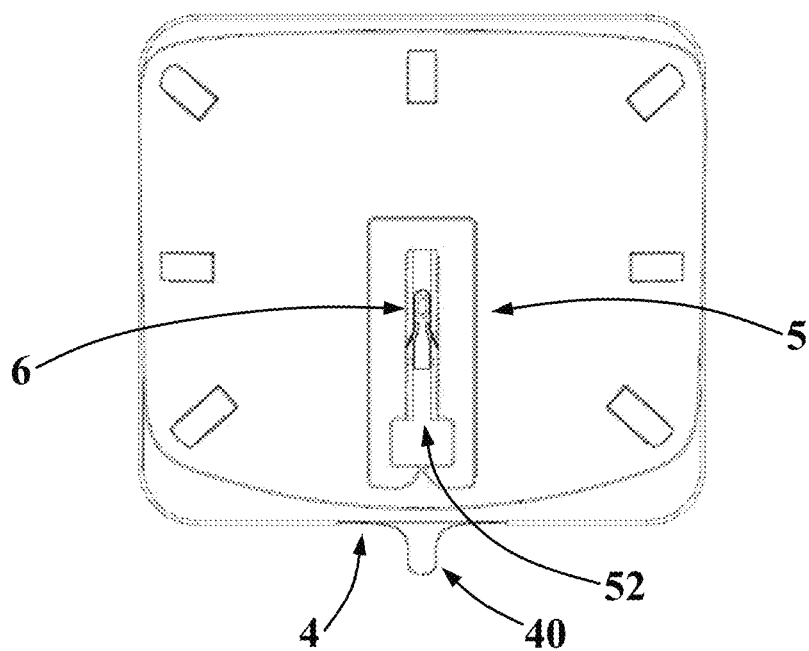
FIG. 5 shows a bottom plan view of the support element of FIG. 2.

With reference to the enclosed drawings, reference number 1 overall indicates the support element, object of the present invention, which as better set forth below is advantageously employable as a seat 100 or as a back 101 of a chair 10.

In particular, in the course of the description and in the embodiment illustrated in the enclosed figures, a support element 1 used as a seat 100 for a user will be considered, nevertheless it being possible to provide for different uses of the support element 1 without departing from the protective scope of the present invention.

Therefore, in the course of the description the expressions support element 1 and seat 100 will be intended to be interchangeable, since both can be intended as indicating a support element 1, object of the present invention.

In accordance with the invention, the support element 1 comprises a support body 2, provided with an upper face 20 and with an opposite lower face 21.

Preferably, the support body 2 is made of rigid material, such as for example metal, wood or plastic material, and is preferably substantially plate-like.

Advantageously, the support body 2 can have a substantially planar form, or alternatively it can have an ergonomic form, slightly curved, so as to be better adapted to the user in seated position, or even for more comfortably receiving the back of the user himself/herself.

In particular, during the use of the chair 10, the lower face 21 of the support body 2 is advantageously intended to be directed towards the ground, while the opposite upper face 20 is intended to be directed upward.

The support element 1 also comprises a flexible covering element 3, e.g. made of fabric or leather. The covering element 3 is placed to cover at least the upper face 20 of the support body 2 and is provided with a perimeter portion 30.

In particular, the support body 2 of the support element 1 is provided with an external edge 2', which perimetrically delimits the support body 2, and preferably the covering element 3 encloses the upper face 20 of the support body 2 and the external edge 2' of the support body 2.

Advantageously, the covering element 3 is delimited by a perimeter edge 30', and the perimeter portion 30 of the covering element 3 is preferably placed in proximity to the perimeter edge 30'.

More in detail, by perimeter portion 30 of the covering element 3, it must be intended a peripheral portion of the covering element 3 itself. In other words, the perimeter portion 3 is placed in proximity to the perimeter edge 30' of the covering element 3, but not necessarily at the perimeter edge 30' itself.

Advantageously, the covering element 3 is provided with a flexibility such to allow it to be pulled, in order to be fit to cover the support body 2.

Preferably, the covering element 3 is mechanically connected to the lower face 21 of the support body 2, so as to completely cover the upper face 20 and at least part of the lower face 21.

Advantageously, the support element 1 also comprises an intermediate layer 8, preferably made of elastic foam (e.g. of expanded polyurethane), which is placed between the support body 2 and the covering element 3, in order to render the sitting of a user on the seat 100 more comfortable.

The support element 1 also comprises a flexible tensioning element 4, which is engaged with the perimeter portion 30 of the covering element 3.

Preferably, the tensioning element 4 is engaged along the entire perimeter portion 30 and, still more preferably, is engaged substantially along the entire perimeter edge 30' of the covering element 3.

Preferably, the tensioning element 4 is fixed to the perimeter portion 30 of the covering element 3, e.g. by means of nails or metal points.

Advantageously, the covering element 3 is advantageously provided with a passage seat 31 made at the perimeter edge 30', within which an engagement portion 41 of the tensioning element 4 is inserted.

Preferably, the passage seat 31 can be obtained by means of bending and stitching of the same perimeter edge 30' in order to create a through slot. Of course, it is also possible to create a passage seat 31 by means of stitching a further element or by means of stitching the same tensioning element 4.

For example, in accordance with the embodiment illustrated in the enclosed figures, the tensioning element 4 is a twine or a cord, which is inserted along the perimeter edge 30' of the covering element 3, and more precisely within the passage seat 31.

The engagement portion 41 of the tensioning element 4 is preferably fixed within the passage seat 31, so as to be integral with the perimeter portion 30 of the covering element 3. Otherwise, without departing from the protective scope of the present invention, the engagement portion 41 of the tensioning element 4 can be slidably engaged with the perimeter portion 30 of the covering element 3, allowing the tensioning element 4 a relative movement with respect to the covering element 3.

The tensioning element 4 is provided with a grip portion 40, which is susceptible of being stretched in order to tighten the covering element 3.

Advantageously, the grip portion 40 is advantageously separated from the covering element 3, and is in particular (locally) released from the latter and placed outside the passage seat 31 (if present) of the covering element 3 itself, such that it can be grasped and stretched.

In this manner, the tensioning element 4, and more precisely its engagement portion 41, is pulled, driving with it the perimeter portion 30 of the covering element 3 (with which it is integrally engaged), and therefore allowing the tensioning of the latter.

In other words, the covering element 3 is advantageously perimetrically provided with the tensioning element 4 such that, by pulling the grip portion 40, it is possible to substantially tension the entire covering element 3.

The grip portion 40 is constrained to the support body 2 in order to maintain the covering element 3 taut on the support body 2.

In this manner, after the covering element 3 has been tensioned, by pulling the grip portion 40 of the tensioning element 4, the same grip portion 40 constrained to the support body 2 allows constraining the covering element 3 in position, so as to reduce the possibility of possible loosening of the covering element 3 with respect to the support body 2 itself.

In accordance with the idea underlying the present invention, the support element 1 also comprises at least one guide element 5, which is fixed to the lower face 21 of the support body 2 and is extended along a main extension direction X.

In particular, the guide element 5 comprises a slide channel 52 which is extended along the aforesaid main extension direction X.

Advantageously, the guide element 5 and the support body 2 can be made in a single body, with the guide element made directly on the latter, for example with the slide channel 52 made in a depression from the lower face 21 of the support body 2 or passing between the lower face 21 and the upper face 20.

Otherwise, the guide element 5 can be fixed to the support body 2, in particular protruding from the lower face 21 of the latter. More particularly, on the support body 2, a suitable insertion seat can be made, in which the guide element 5 is inserted (and preferably fixed). The support element 1 also comprises a traction element 6 (preferably made of polymer or metal material), which is mechanically connected to the grip portion 40 of the tensioning element 4 and is slidably engaged in the guide element 5, and in particular in the slide channel 52, in order to tighten the covering element 3 among multiple tensioning positions.

In particular, the traction element 6 is slidable along the aforesaid main extension direction X.

More in detail, as better described hereinbelow, the traction element 6 is movable by a user along the main extension direction X in order to make it slide in the guide channel 21 of the guide element 5.

Advantageously, the traction element 6 is slidably housed in the slide channel 52 so as to be slidable in the slide channel 52, but simultaneously being prevented from rotating around the main extension direction X.

Advantageously, the traction element 6 is removably connected to the grip portion 40 of the tensioning element 4, so as to allow releasing the tensioning element 4 from the traction element 6 and vice versa.

In this manner, the covering element 3 can be easily placed under tension when it is fit on the support body 2 by moving the traction element 6 along the guide element 5. In operation, the traction element 6 being connected to the tensioning element 4, and more precisely to the grip portion 40 of the latter, the movement of the traction element 6 along the guide element 5 involves the tightening of the tensioning element 4 and hence the tensioning of the covering element 3 with which the tensioning element 4 is engaged.

In particular, by pulling the grip portion 40 of the tensioning element 4, also the engagement portion 41 of the latter is stretched, which is advantageously fixed to the perimeter portion 30 of the covering element 3. Consequently, the engagement portion 41 being integral with the perimeter portion 30, this in turn tensions the covering element 3 on the support body 2 of the support element 1.

In this manner, in the event in which the covering element 3 is loosened and/or is creased, the latter can be easily newly tensioned, by acting on the traction element 6.

The support element 1 also comprises a coupling system 7, which is configured for removably coupling the traction element 6 to the guide element 5 in a pre-established tensioning position.

More in detail, the coupling system 7 is configured for allowing the engagement of the traction element 6 with the guide element 5 in multiple possible tensioning positions. This allows determining the level of tensioning of the covering element 3 on the support body 2, which can depend on various factors such as, for example, the elasticity and/or the flexibility of the covering element 3 itself.

Advantageously, the coupling system 7 is a check coupling system.

More in detail, the coupling system 7 is configured for allowing the movement of the traction element 6 along the main extension direction X (engaged with the guide element 5) in a tensioning direction T in which the covering element 3 is progressively tensioned, and in order to block the movement of the traction element 6 in a loosening direction A, opposite the tensioning direction T.

Figure 6:
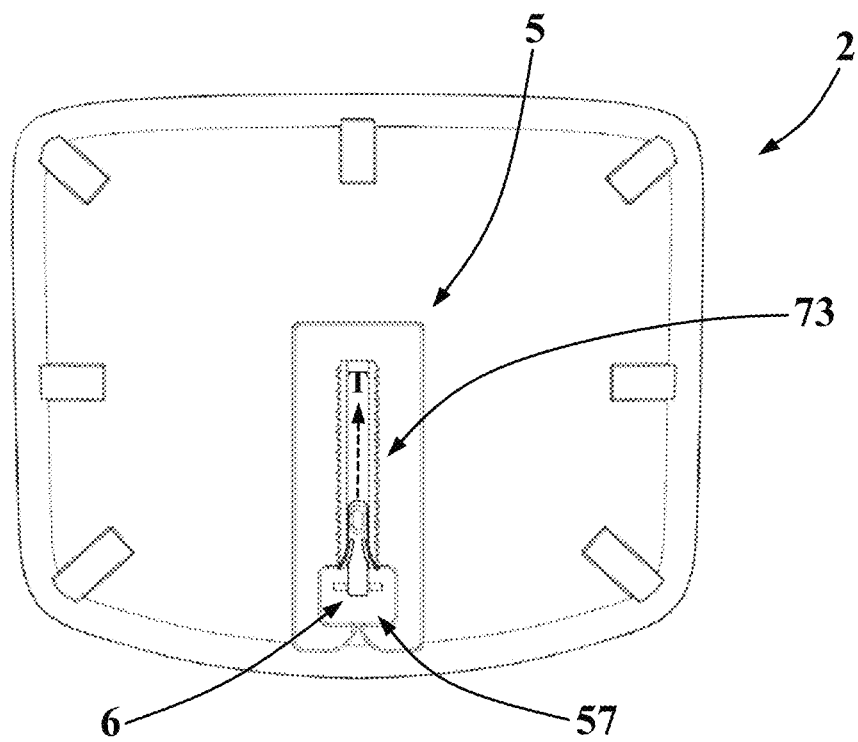
FIG. 6 shows a bottom plan view of the support element of FIG. 2, with a traction element in a minimum tensioning position.
Figure 7:
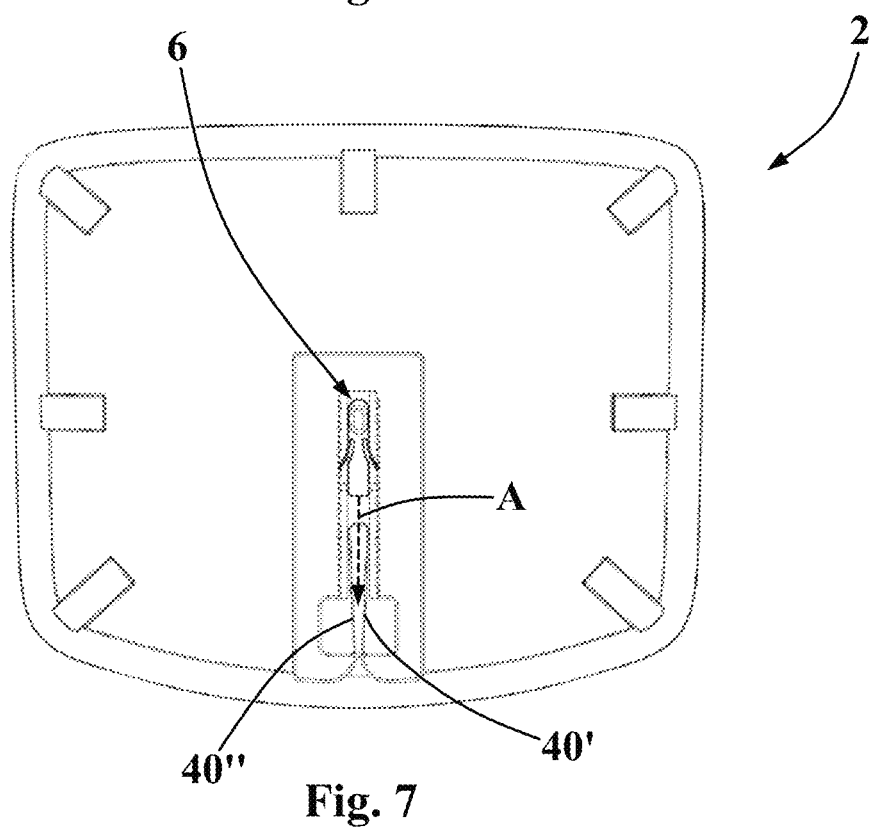
FIG. 7 shows a bottom plan view of the seat of FIG. 2, with a traction element in a maximum tensioning position.
Figure 8:
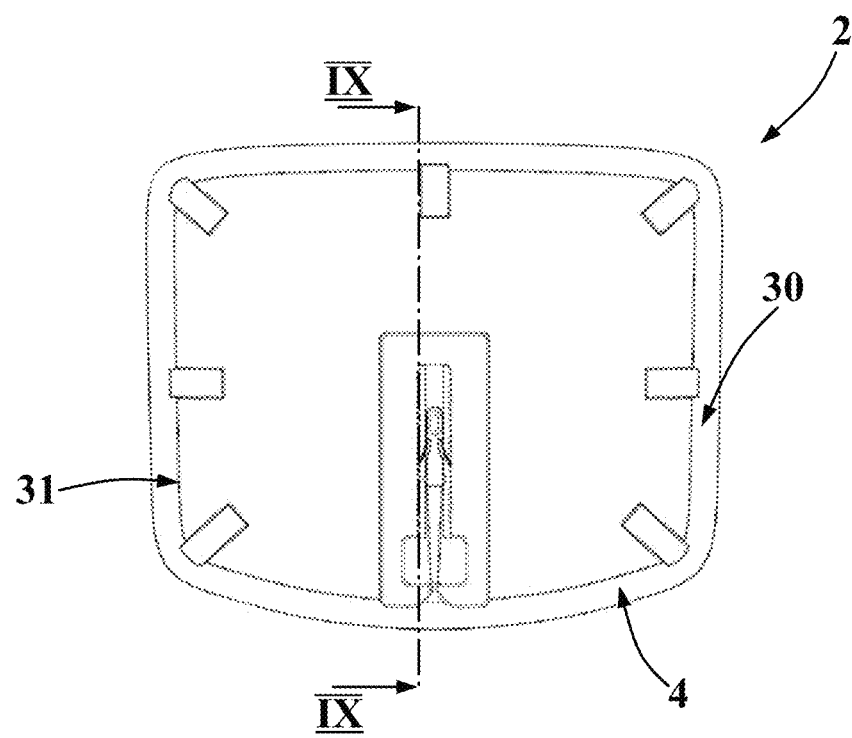
FIG. 8 shows a bottom plan view of the seat of FIG. 2, with a traction element in an intermediate position of tensioning and a tensioning element engaged with the traction element itself.
Figure 9:
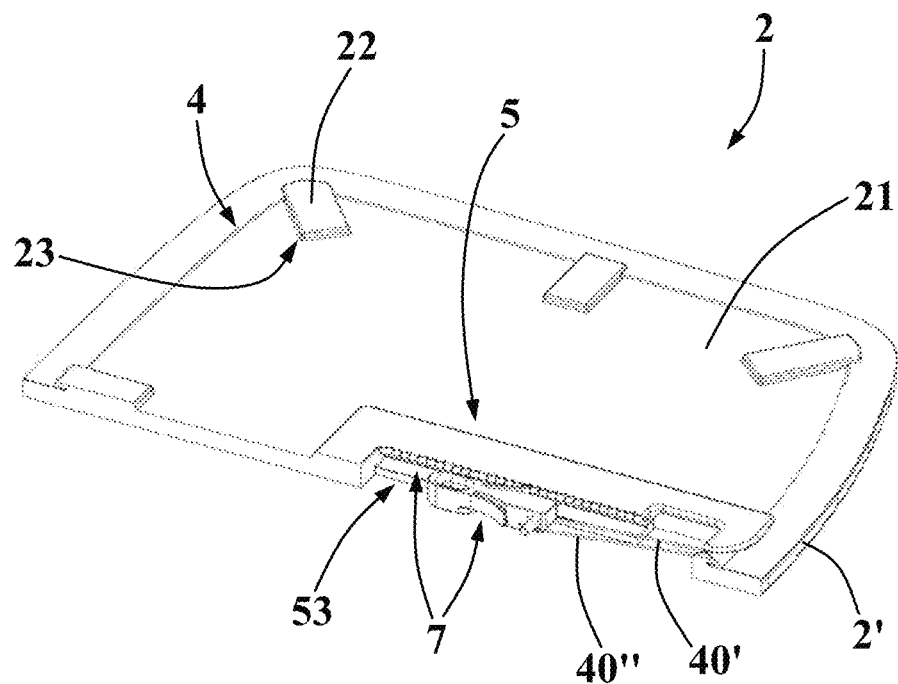
FIG. 9 shows a sectional perspective view of the support element of FIG. 8, according to the trace IX-IX of FIG. 8 itself.
Figure 10:
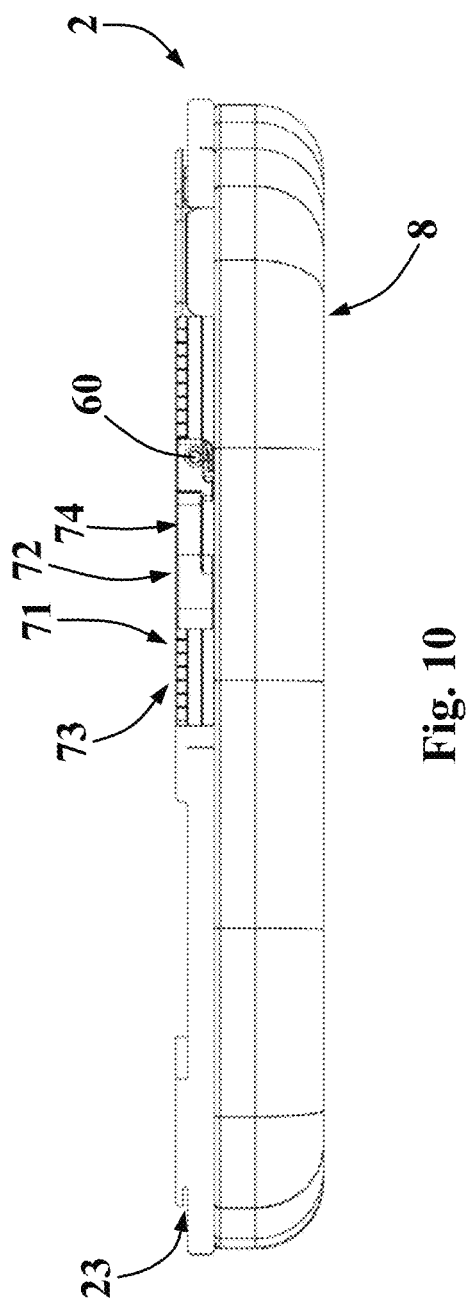
FIG. 10 shows a side section view of the support element of FIG. 8, according to the trace IX-IX of FIG. 8 itself.
Figure 11:
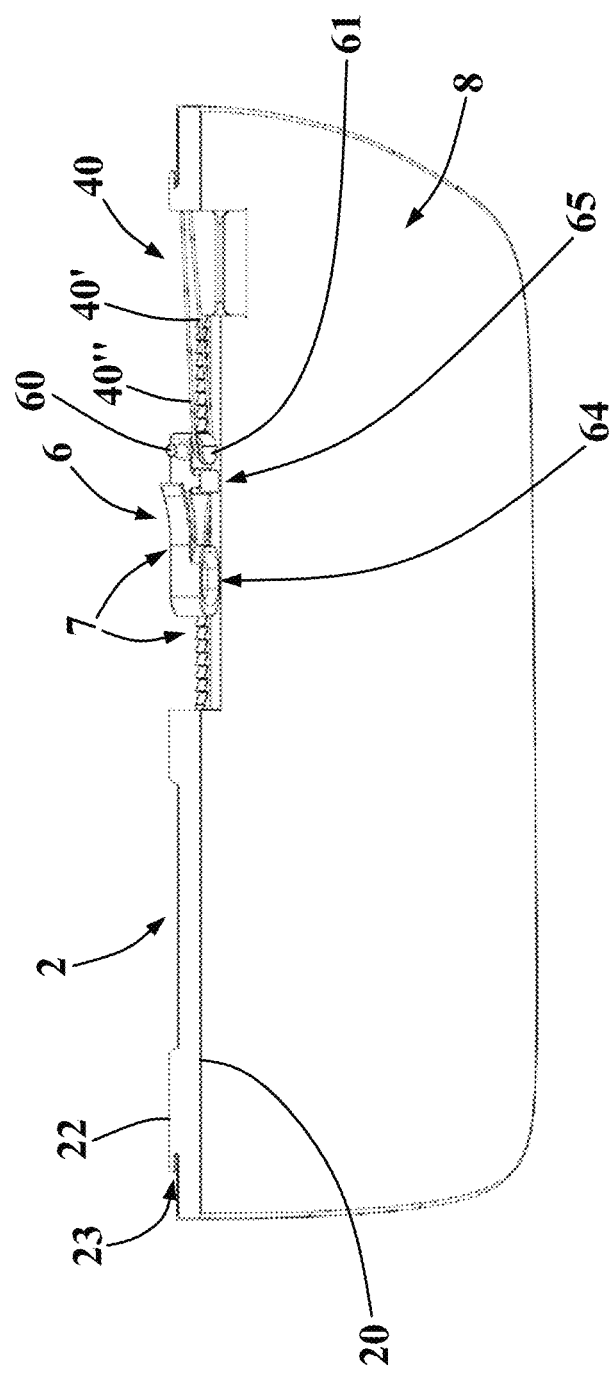
FIG. 11 shows a further side section view of the support element of FIG. 8, according to the trace IX-IX of FIG. 8 itself.

In particular, the traction element 6 can be moved between a minimum tensioning position (illustrated for example in FIG. 6) and a position of maximum tensioning (illustrated for example in FIG. 7) in which the covering element 3 is subjected respectively to a minimum and maximum tensioning.

In this manner, the coupling system 7 allows progressively tensioning the covering element 3 without excessively stretching it and in a sudden manner, and therefore reducing the risk of breaking it.

In this manner, the traction element 6 remains tensioned in the pre-established tensioning position without the risk that the covering element 3 be loosened.

Advantageously, the coupling system 7 comprises a first engagement element 71, fixed to the guide element 5, and a second engagement element 72, fixed to the traction element 6 and couplable to the first engagement element 71 in order to constrain the traction element 6 in a pre-established tensioning position in the guide element 5.

Preferably, the first and the second engagement element 71, 72 are made in a single body respectively with the guide element 5 and with the traction element 6.

Advantageously, the first engagement element 71 comprises a plurality of teeth 73, fixed to the guide element 5.

Advantageously, the second engagement element 72 comprises at least one flexible tab 74, which is fixed to the traction element 6 and is configured for being snappingly engaged to the teeth 73 of the first engagement element 71. Preferably, the second engagement element 72 of the coupling system 7 comprises two flexible tabs 74, which are made in a single body with the traction element 6.

More in detail, the traction element 6 is provided with a central body 62, which is placed substantially parallel to the main extension direction X when the traction element 6 is housed in the guide element 5. In particular, the central body 62 is extended between a first and a second lateral flank 62', 62", and each flexible tab 74 is preferably made by protruding respectively from the first and from the second lateral flank 62', 62" of the central body 62. More in detail, the second engagement element 72 comprises a first flexible tab 74, which is extended protruding from the first lateral flank 62', and a second flexible tab 74, which is extended protruding from the second lateral flank 62".

Advantageously, the central body 62 of the traction element 6 is extended between a front portion 6', oriented in the tensioning direction T, and an opposite rear portion 6", to which the grip portion 40 of the tensioning element 4 is preferably connected.

Advantageously, each flexible tab 74 is extended between a first end 74', fixed to the traction element 6, in particular to a corresponding lateral flank 62', 62" of the central body 62, and an opposite second end 74", free, which is susceptible of being engaged to the teeth 73 in order to constrain the traction element 6 in the above-described manner.

In accordance with the preferred embodiment, illustrated in the enclosed figures, the slide channel 52 is laterally delimited by two lateral walls 53, and the plurality of teeth 73 is extended protruding from at least one of the two lateral walls 53.

In particular, the lateral flanks 62', 62" of the central body 62 are placed facing and parallel to the lateral walls 53 of the slide channel 52, so as to allow the sliding of the traction element 6 along the main extension direction X, preventing however the rotation around the traction element 6 along the same main extension direction X.

Preferably, the lateral flanks 60', 62" of the central body 62 are placed facing the lateral walls 53 of the slide channel 52, in order to guide the sliding of the traction element 6 along the main extension direction X.

More in detail, each tooth 73 projects protrudingly from a lateral wall 53 of the guide element 5, transverse to the main extension direction X, and is placed to partially intercept the slide channel 52.

Advantageously, the first engagement element 71 comprises a first toothing 73' and a second toothing 73", each of which formed by a plurality of teeth 73, in which the first toothing is placed on one of the two lateral walls 53 of the guide element 5, and the second toothing is placed on the other lateral wall 53.

Advantageously, the first and the second toothing 73', 73" are extended along the entire lateral walls 53 and preferably along the entire slide channel 52.

Therefore, the first and the second toothing 73', 73" of the first engagement element 71 between them define a narrow section of the slide channel 52, in which the traction element 6 is susceptible of sliding.

Preferably, the teeth 73 of each toothing 73', 73" are placed aligned, parallel to the main extension direction X of the guide element 5.

Advantageously, each tooth 73 is provided with a stop section 730, placed substantially orthogonal to the main extension direction X, and an introduction section 731, which is connected to the stop section 730 and is placed tilted with respect to the latter, preferably by an angle comprised between 30° and 80°, and more preferably between 40° and 60°.

Advantageously, each stop section 730 of a tooth 73 delimits, with the introduction section 731 of a subsequent tooth 73, a housing seat 75, in which it is susceptible of being snappingly engaged to the flexible tab 74 in order to constrain the traction element 6 in a pre-established tensioning position.

More in detail, each flexible tab 74 is elastically pliable between a disengagement position, in which the flexible tab 74 is close to the traction element 6 in order to allow its movement along the main extension direction X in the tensioning direction T, and an engagement position, in which the flexible tab 74 is spaced from the traction element 6 in order to be engaged with the teeth 73 of the first engagement element 71, preventing the movement of the traction element 6 along the main extension direction X, in the loosening direction A.

In particular, during the movement of the traction element 6 along the slide channel 52, the flexible tab 74, impacting against the introduction section 731 of a tooth 73, is elastically bent towards the disengagement position, allow the further advancement of the traction element 6 and, when the flexible tab 74 exceeds the aforesaid introduction section 731, the latter can automatically return towards the engagement position, in which it engages the housing seat 75.

In such situation, the flexible tab 74 can continue further along the tensioning direction T (in the above-described manner) or it can be constrained in such engagement position so that it is prevented from being moved in the loosening direction A due to the interference between the flexible tab 74 and the stop section 730 of the tooth 73.

More in detail, each flexible tab 74 is provided with a concave portion 76, which is provided with a concavity directed towards the lateral wall 53 from the corresponding teeth 73 are extended, with which the flexible tab 74 is intended to be engaged. In such a manner, the second end 74" of the flexible tab 74 is curved and is preferably provided with an extension substantially parallel to the introduction section 731 of the teeth 73, so as to improve the coupling between the latter and the flexible tab 74. Advantageously, the lateral flanks 62', 62" of the central body 62 of the traction element 6 have a narrow section at the flexible tabs 74, and are in particular provided with a hollow profile, substantially counter-shaped with respect to the flexible tabs 74, so as to be able to substantially receive them laid down when the latter are in the disengagement position. Advantageously, the guide element 5 is provided with at least one guide channel 50, which is extended substantially parallel to the main extension direction X.

Preferably, in accordance with the preferred embodiment illustrated in the enclosed figures, the guide element 5 is provided with two guide channels 50.

Advantageously, each guide channel 50 is made in the form of grooves on the corresponding lateral wall 53, and is extended in depression on the latter, orthogonal to the main extension direction X.

Advantageously, each guide channel 50 is placed above the corresponding toothing 73', 73", in a position closer to the upper face 20 of the support body 2.

Advantageously, each guide channel 50 is delimited above and below by corresponding guide walls 54, which are connected together by a bottom wall 55.

Advantageously, the traction element 6 comprises at least one guide pin 60, which projects protrudingly from the traction element 6, transverse to the main extension direction X, preferably orthogonal to the latter.

Preferably, in accordance with the embodiment illustrated in the enclosed figures, the traction element 6 comprises two guide pins 60, preferably cylindrical, which are preferably placed symmetrically, in which each guide pin 60 projects protrudingly from the traction element 6, along a guide axis Z transverse to the main extension direction X, and more particularly orthogonal to the latter.

In particular, the guide pins 60 project from the central body 62 of the traction element 6 and are advantageously fixed to the traction element 6, preferably in a single body with the latter.

Advantageously, the pin 60 of the traction element 6 slidably engages the guide channel 50 of the guide element 5 in order to guide the traction element 6 along the main extension direction X.

In particular, each pin 60 projects protrudingly from the traction element 6 and engages a corresponding guide channel 50 of the guide element 5, where it is guided in its sliding by the guide walls 54. In this manner the guide channel 50 allows a guided sliding of the traction element 6 along the guide element 5, maintaining it stably housed in the guide element 5, preventing an accidental disengagement.

Advantageously, the distance between the bottom walls 55 of the guide channels 50 is greater than the width of the traction element 6 (measured at the guide pins 60). In this manner, each pin 60 is placed spaced from the corresponding lateral wall 53 of the guide channel 50 in which it is housed, so as to allow an easy advancement of the traction element 6 along the main extension direction X, and in particular in the tensioning direction T.

Advantageously, each pin 60 abuts against one or both the guide walls 54 of the corresponding guide channel 50, in order to prevent vertical movements of the traction element 6 with respect to the guide element 5, which would cause the disengagement of the flexible tabs 74 of the second engagement element 72 from the teeth 73 of the first engagement element 71 of the coupling system 7.

In addition, advantageously, each pin 60 is housed in the corresponding guide channel 50, preferably to size, so as to prevent the rotation of the traction element 6 around the main extension direction X.

Advantageously, the central body 62 of the traction element 6 is provided with a grip zone 63, which is preferably placed at the front portion 6'. In particular, the grip zone 63 is provided with a through hole 64 orthogonal to the main extension direction X, which allows a user to grasp the traction element 6 at its grip zone 63 in order to stretch it in the tensioning direction T. For such purpose, the user can use a suitable tool, such as for example an Allen wrench, inserting it in the through hole 64 of the grip zone 63 in order to stretch the traction element 6.

Advantageously, the traction element 6 is also provided with a guide portion 65, which projects protrudingly from the central body 62 and is directed towards the slide channel 52 in order to engage it, so as to maintain the traction element 6 itself stable within the guide element 5.

Preferably, the guide portion 65 is placed behind the flexible tabs 74 with respect to the tensioning direction T, and still more preferably behind the second end 74" of the flexible tabs 74 themselves.

Advantageously, the guide element 5 is provided with a slide seat 56, which is delimited by the upper guide walls 54, and more precisely by a terminal edge 54' thereof directed towards the slide channel 52.

Advantageously, the guide portion 65 of the traction element 6 is slidably engaged in the aforesaid slide seat 56, in order to maintain stable the traction element 6 during its advancement in the tensioning direction T along the main extension direction X.

Advantageously, the main extension direction X of the guide element 5 is rectilinear.

In this manner, the tensioning of the covering element 3 can be carried out more easily by pulling the traction element 6 along the rectilinear main extension direction X.

Preferably, the main extension direction X of the guide element 5 is substantially orthogonal to one side of the support element 1, and more particularly of its support body 2. In particular the main extension direction X is orthogonal to the side of the support body 2 from which the grip portion 40 of the tensioning element 4 is extended.

More in detail, the tensioning element 4 is extended starting from the aforesaid side of the support body 2 towards a central portion of the latter. In particular, the tensioning element 4 is extended towards a central portion of the lower face 21 of the support body 2.

Advantageously, the tensioning element 4 is extended starting from the aforesaid side of the support body 2 towards a side opposite the same support body 2.

More in detail, the grip portion 40 of the tensioning element 4 has two opposite grip ends 40', 40", which can be free or joined together, and is extended, starting from one side of the support element 1, preferably substantially orthogonal to such side. In this manner, the grip ends 40', 40" are stretched in an equivalent manner by the traction element 6 and, therefore, the covering element 3 is tensioned in a uniform manner.

Preferably, the two grip ends 40', 40" are connected to the (same) central body 62 of the traction element 6.

In this manner, in operation, by means of a single movement of the traction element 6 both the ends 40', 40" of the grip portion 40 are stretched, and hence the covering element 3 is fully tensioned in a quick and easy manner.

Advantageously, the guide element 5 comprises two introduction wings 58, which are placed upstream of the slide channel 52 of the guide element 5 (in accordance with the tensioning direction T along the main extension direction X) and each define a respective introduction section 59 in which the tensioning element 4 is inserted, and more preferably its grip ends 40', 40". In particular, the two introduction wings 58 are placed symmetrically with respect to the main extension axis X, and are configured such that the grip ends 40', 40" of the tensioning element 4 are substantially parallel to each other (in particular in one section of the grip ends 40', 40" comprised between the introduction wings 58 themselves and the traction element 6). In this manner, the grip ends 40', 40" are stretched in an equivalent manner by the traction element 6 as described above, allowing the uniform tensioning of the covering element 3.

Advantageously, the guide element 5 is provided with an insertion portion 57, which is placed between the slide channel 52 and the introduction wings 58, and is preferably enlarged with respect to the slide channel 52, in order to allow an easier insertion of the traction element 6 in the guide element 5.

Advantageously, the guide element 5 is provided with at least one release through opening 51, in order to allow disengaging the traction element 6 from the guide element 5.

Preferably, the release opening 51 is extended parallel to the main direction X of the guide element 5 between the first and the second toothing 73', 73" of the first engagement element 71 of the coupling system 7, and is therefore placed below the support body 2, substantially aligned with the lower face 21 of the latter.

In this manner, it is possible to extract the traction element 6, disengaging it from the guide element 5, for example in order to release it from the tensioning element 4 in the event in which it is necessary to proceed with a substitution of the covering element 3.

Figure 12:
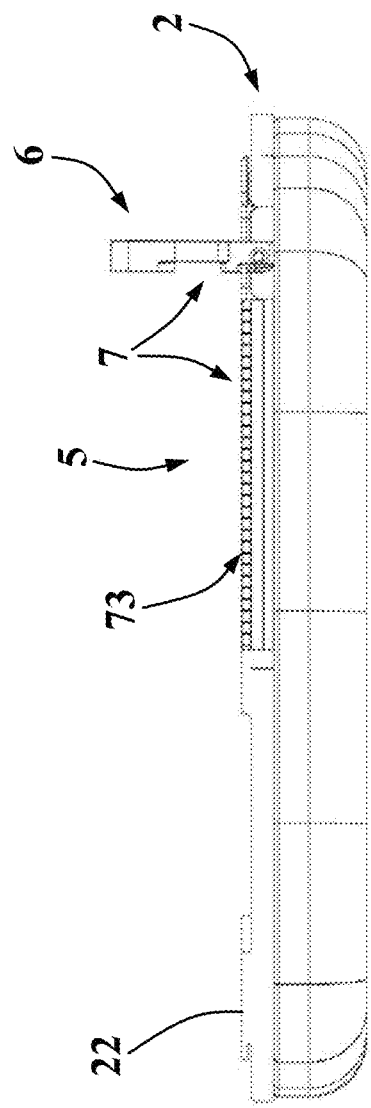
FIG. 12 shows a side section view of the support element of FIG. 8, according to the trace IX-IX of FIG. 8 itself, with a traction device partially disengaged from a guide element for seating.
Figure 13:
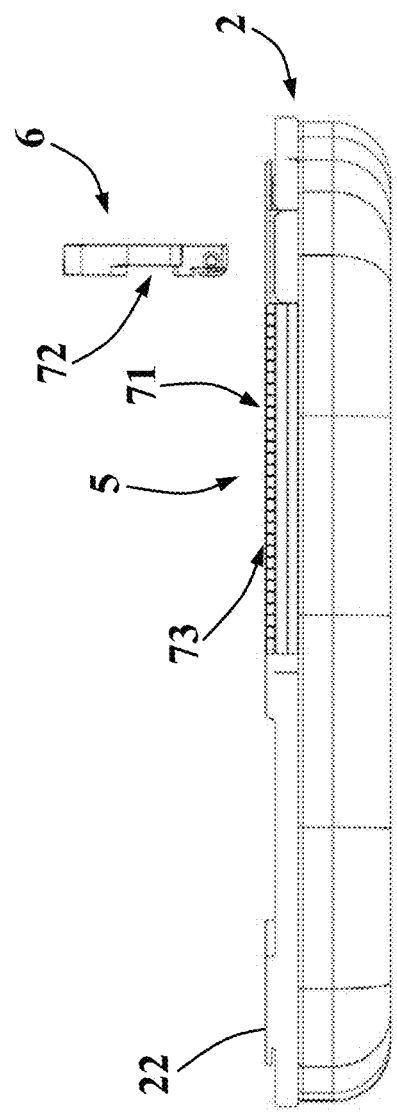
FIG. 13 shows a side section view of the support element of FIG. 8, according to the trace IX-IX of FIG. 8 itself, with a traction device completely disengaged from a guide element of the seat.
Figure 14:
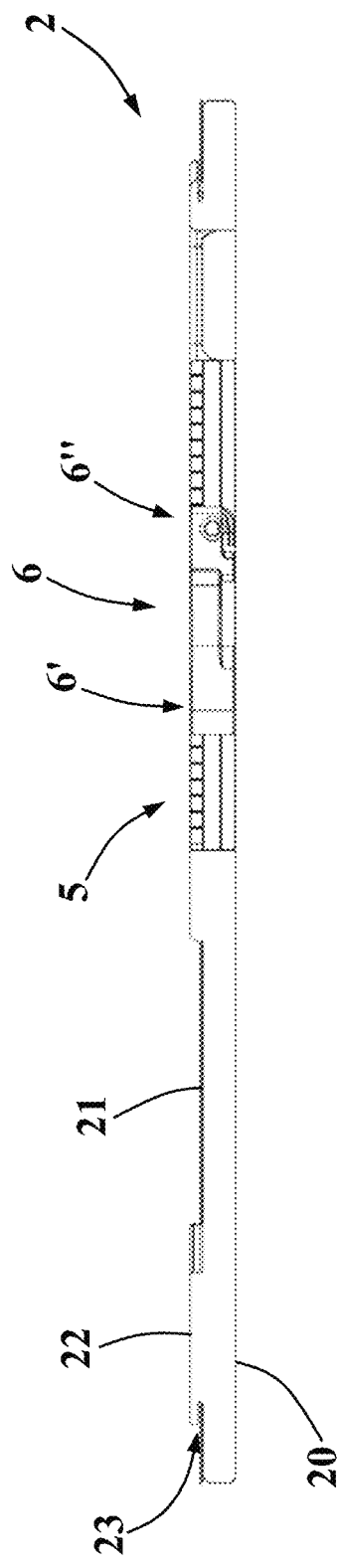
FIG. 14 shows the side section view of FIG. 12 with several parts removed in order to better show other parts.
Figure 15:
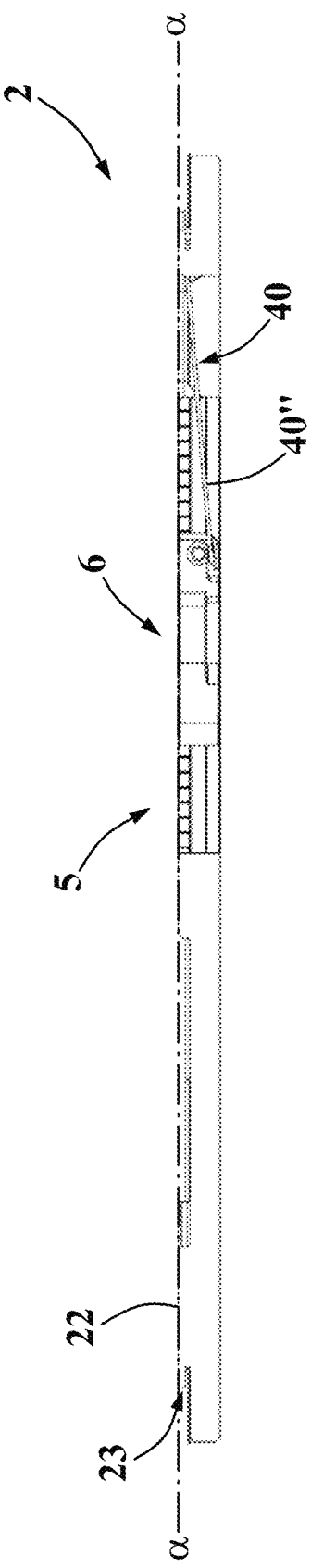
FIG. 15 shows the side section view of FIG. 12 with a tensioning element engaged with the traction element of the seat.
Figure 16:
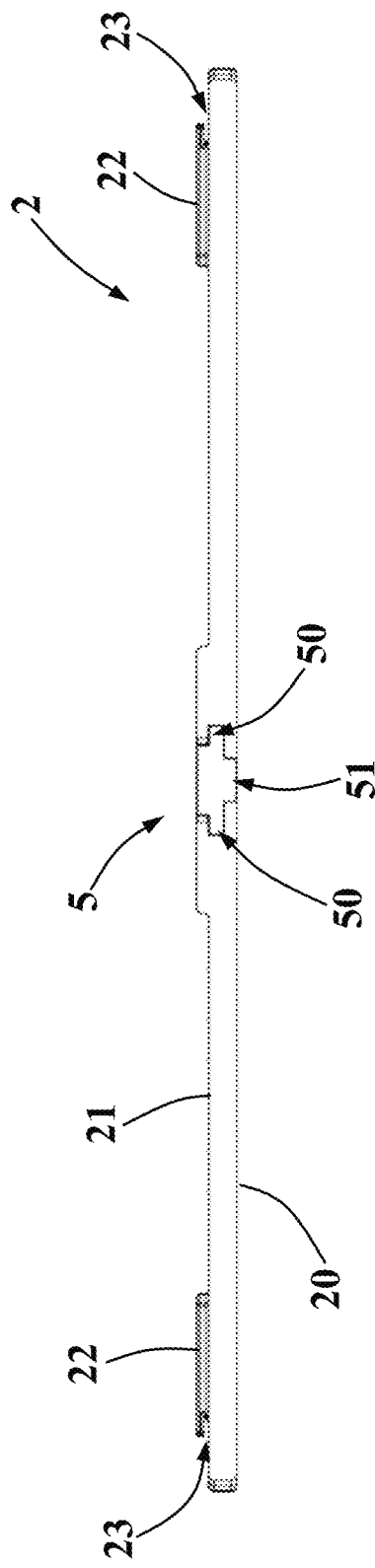
FIG. 16 shows a rear view of the support element of FIG. 2.
Figure 17:
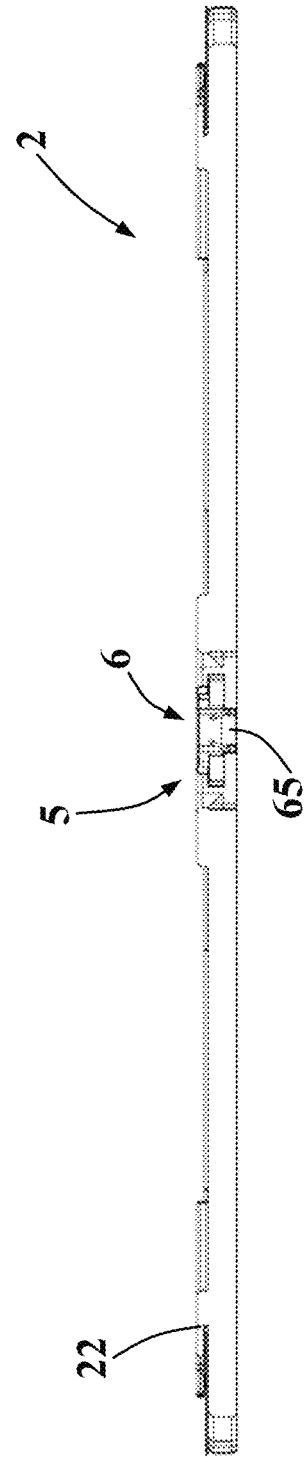
FIG. 17 shows a rear view of the support element of FIG. 2, with several parts removed in order to better show other parts.
Figure 18:
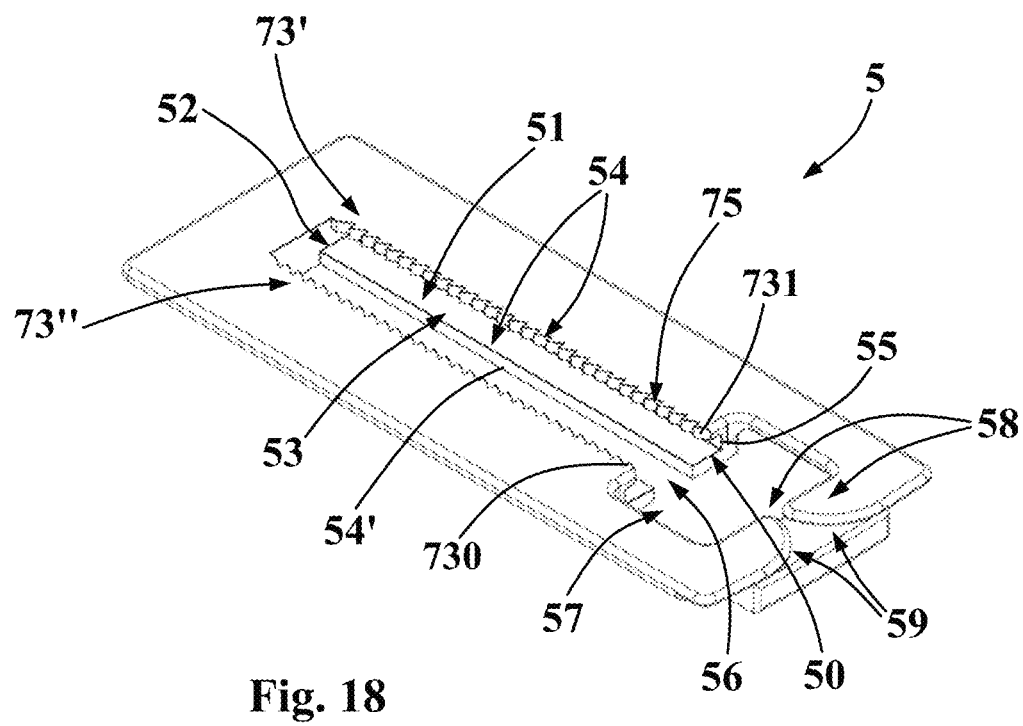
FIG. 18 shows a detail of the support element of FIG. 2, relative to a guide element.
Figure 19:
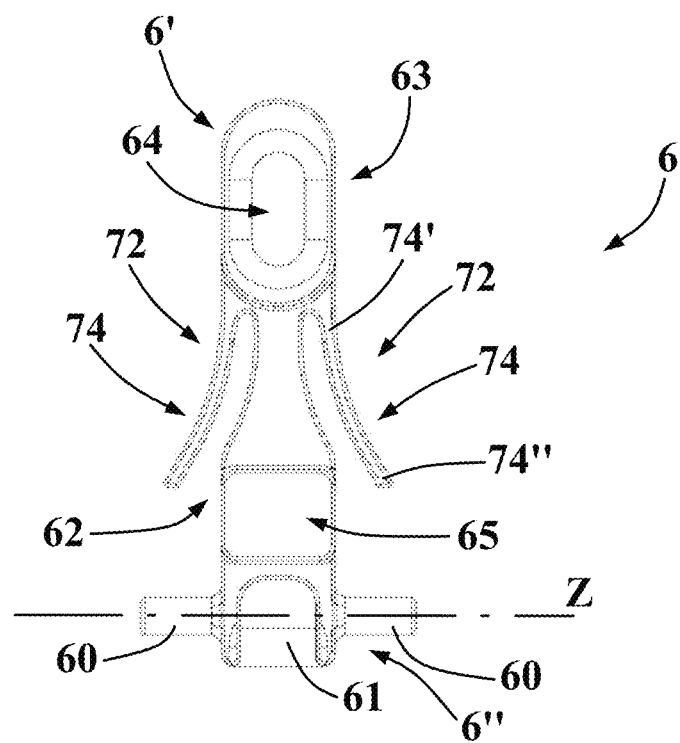
FIG. 19 shows a detail of the support element of FIG. 2, relative to a traction element seen in bottom plan view.
Figure 20:
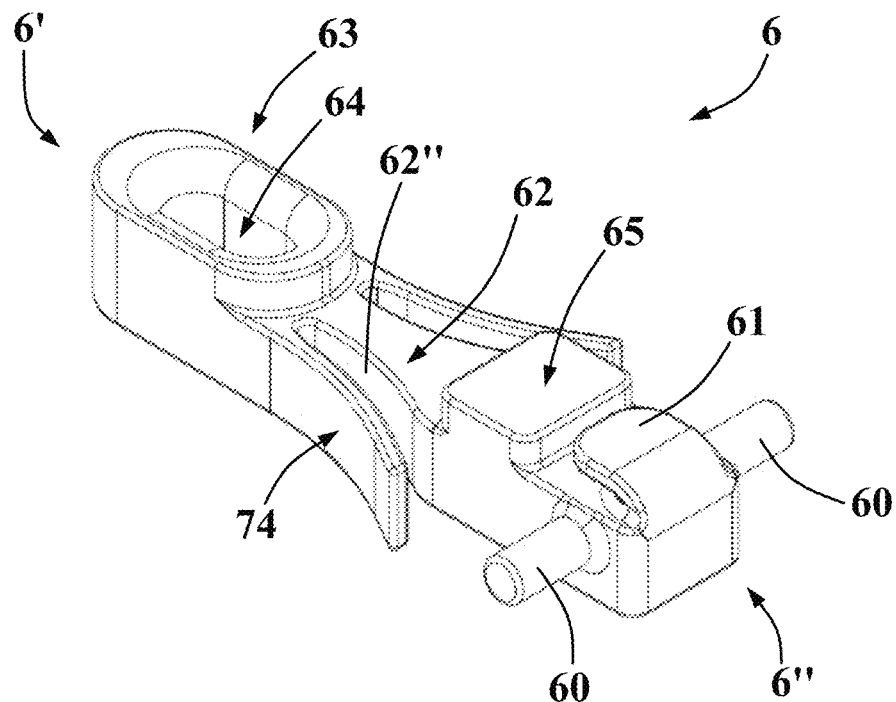
FIG. 20 shows the traction element of FIG. 19 in a top perspective view.
Figure 21:
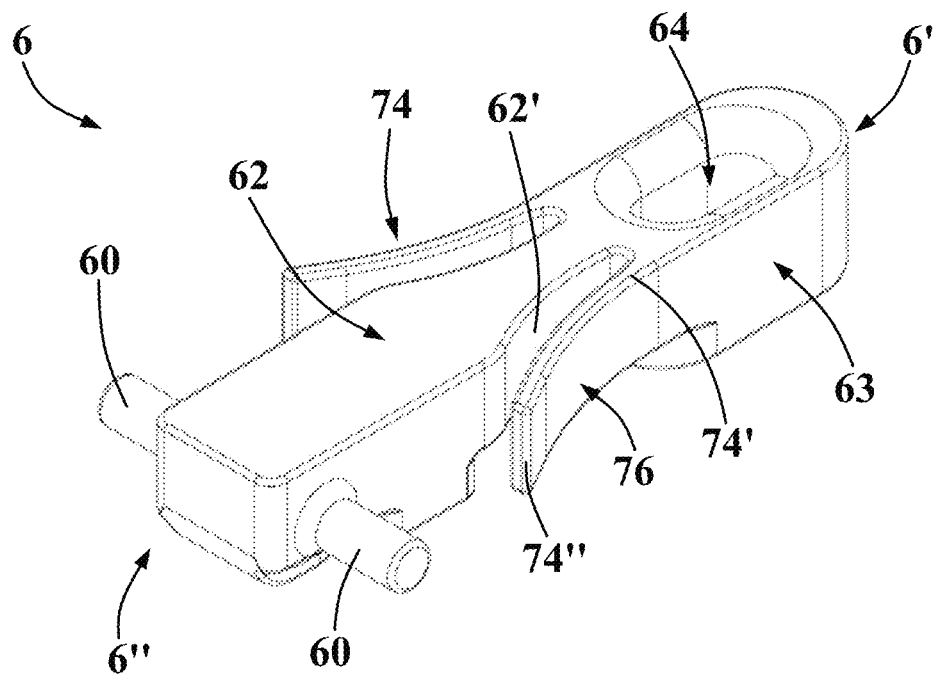
FIG. 21 shows the traction element of FIG. 19 in a bottom perspective view.

In particular, in accordance for example with FIGS. 12 and 13, the traction element 6 is disengaged from the guide element 5 by rotating it around the guide axis Z of the guide pins 60, bringing its front portion 6' outside the guide element 5 through the release opening 51, directed below the seat 100 (i.e. towards the ground).

In this situation, the first and the second engagement element 71, 72 of the coupling system 7 are released, and the traction element 6 is thus situated constrained to the guide element 5 by means of only the guide pins 60 which are slidably engaged in the respective guide channels 6. Consequently, the traction element 6 is made to slide in the loosening direction A, the second engagement element 72 not being coupled to the first engagement element 71 and therefore the movement along the aforesaid loosening direction A resulting possible.

The traction element 6 placed in the above-described manner is then moved in the loosening direction A along the entire the slide channel 51 up to reaching the insertion portion 57, in which the guide pins 60 disengage the respective guide channels 50 and the traction element 6 itself can be disengaged from the guide element 5.

Advantageously, the traction element 6 comprises a hook 61, and the grip portion 40 of the tensioning element 4 is engaged with the hook 61 in order to connect the tensioning element 4 to the traction element 6, in particular to the central body 62 of the latter.

In this manner, a user can advantageously engage the tensioning element 4 with the hook 61 of the traction element 6 before inserting the latter in the guide element 5 through the aforesaid insertion portion 57.

In operation, when the traction element 6 is pulled in the tensioning direction T, also the tensioning element 4 is tensioned which is engaged with the latter through the hook 61 and, consequently, the tensioning element 4 places the covering element 3 of the seat 100 under tension, with which it is engaged along the perimeter portion 30.

Advantageously, the traction element 6 is pivoted to the guide element 5 around the guide pin 60 and preferably the hook 61 of the traction element 6 is placed non-aligned with respect to the guide pin 60, in order to determine a bending moment F on the traction element 6 and maintain the traction element 6 housed in the guide element 5.

In particular, the hook 61 is placed above the guide pin 60, towards the support body 2 of the seat 100.

In this manner, the tensioning element 4 exerts, on the traction element 6, a tensioning force comprising a first component, with horizontal direction along the main extension direction X, and a second component, with vertical direction.

More in detail, the first component of the tensioning force exerted by the tensioning element 4 on the traction element 6 is directed in the loosening direction A, while the second component of the same force is directed towards the ground.

Advantageously, the aforesaid first component of the tensioning force tends to pull the traction element 6 in the loosening direction A. Consequently, the flexible tabs 74 of the second engagement element 72 of the coupling system 7 come to abut against the stop section 730 of a corresponding tooth 73 of the first engagement element 71, in this manner blocking the movement of the traction element 6 in the loosening direction A, such that the traction element 6 is blocked in a stable manner in a pre-established tensioning position in the guide element 5.

Advantageously, the aforesaid second component of the tensioning force tends to determine the aforesaid bending moment F on the traction element 6 with pivot substantially placed at the guide axis Z.

In particular, the bending moment F tends to push a front portion 6' of the traction element 6 (placed downstream of the traction element 6 with respect to the tensioning direction T) away from the teeth 73 of the first engagement element 71, and hence also away from the release opening 51. In this manner, the second engagement element 72 of the traction element 6 remains constrained to the first engagement element 71 of the coupling system 7 without risking to be accidentally released from the latter, being disengaged through the release opening 51.

Advantageously, the front portion 6' of the traction element 6, following the bending moment F determined by the action of the tensioning element 4 around the guide axis Z, comes to abut against the seat 100, in particular against the intermediate layer 8, allowing the traction element 6 itself to remain within the slide channel 52 of the guide element 5. Preferably, the grip portion 40 of the tensioning element 4 is extended with its grip ends 40', 40" from the engagement portion 41 (up to being engaged with the hook 61) along a direction that is tilted with respect to the substantially horizontal lying plane a on which the support body 2 of the support element 1 lies, so as to advantageously increase the second component (directed towards the ground) of the tensioning force exerted by the tensioning element 4 on the traction element 6.

Advantageously, the support body 2 is provided with multiple guide wings 22, which are placed perimetrically on the lower face 21 and each define a respective engagement seat 23 in which at least part of the perimeter portion 30 of the covering element 3 is inserted. Preferably, the perimeter portion 30 of the covering element 3 is inserted in the engagement seats 23 defined by the guide wings 22 with its perimeter edge 30', and still more preferably with the passage seat 31 within which the engagement portion 41 of the tensioning element 4 is inserted.

Advantageously, the support body 2 comprises at least two guide wings (for example, with reference to the illustrated embodiment, seven guide wings 22). In this manner, the covering element 3 is tensioned in a uniform manner on the support body 2 in order to be fit on the latter.

Also forming the object of the present invention is a chair 10 for a user seating, which comprises a seat 100 of the above-described type, advantageously intended to support a user in seated position.

Advantageously, the present chair 10 is adapted to be placed as a furnishing element in both public and private settings, and both work and home environments.

More in detail, the chair 10, object of the present invention, is intended to be advantageously used for the sitting of a user, for example for the sitting of a worker in an office or for the sitting of a user in a private and/or home setting.

In accordance with the invention, the chair 10 for the sitting of a user comprises a support structure 11, intended to be abutted against the ground and on which the support element 1 is mounted (which defines, in the embodiment illustrated in the enclosed figures, the seat 100). In particular, the support structure 11 preferably comprises a support base on which a column 14 is mounted, and the seat 100 is mechanically mounted on the column 14 (in particular above). Preferably, the support structure 11 of the chair 10 is connected to the lower face 21 of the support body 2, in particular with the column 14.

Alternatively, in accordance with a non-illustrated embodiment, the support structure 11 of the chair 10 is fixed on lateral portions of the seat 100.

Advantageously, the seat 100 can be rotatably pivoted on the column 14, so as to allow the seat 100 to rotate at the extension axis of the column 14, preferably being able to complete a complete rotation (of 360°) around the latter.

Otherwise, the seat 100 can be fixed on the support structure 11, more precisely on the column 14 or directly on the support structure 11, and therefore be configured for remaining in a fixed position.

Of course, in a non-limiting manner, the seat 100 can be connected to the support structure 11 in different ways and with different degrees of freedom, without departing from the protective scope of the present invention.

Advantageously, the support structure 11 of the chair 10 comprises multiple abutment legs 12, which are preferably provided with wheels 13 in order to allow the movement of the chair 10 on the floor during its use.

Of course, it is also possible to provide for a support structure 11 of base type, without abutment legs, or provide for a support structure 11 in which the legs lack wheels, so as to allow a greater stability of the chair 10 during its use.

The support structure 11 of the chair 10 can be made of a more rigid material, such as in particular a metal material, e.g. steel or aluminum, or alternatively of a plastic material, or made of wood.

In a per se known manner, the chair 10 advantageously comprises a back 101, which can be fixed to the support structure 11, or hinged to the latter, so as to be reclinable between an initial rest position and multiple reclined positions, in particular backward reclining, in order to allow the user to take on a more extended position with respect to a classic seated position, in which the back is placed substantially at a right angle with respect to the legs.

Advantageously, the support element 1, object of the present invention, can also be the aforesaid back 101.

Advantageously, the chair 10 also comprises two arms 16, which can be connected to the support structure 11 or to the seat 100, or to the back 101, and allow resting the arms during sitting, resulting in a more comfortable seat.

The invention thus conceived therefore attains the pre-established objects.

The contents of the Italian patent application number 102023000006429, from which this application claims priority, are incorporated herein by reference.

The invention claimed is:

1. A support element for a chair, said support element comprising:

a support body, provided with an upper face and with an opposite lower face;

a covering element, flexible, placed to cover at least the upper face of said support body and provided with a perimeter portion;

a tensioning element, flexible, which is engaged with the perimeter portion of said covering element and is provided with a grip portion, which is susceptible of being stretched in order to tighten said covering element, and is constrained to said support body in order to maintain said covering element taut on said support body;

at least one guide element, which is fixed to the lower face of said support body and is extended along a main extension direction;

a traction element, which is mechanically connected to the grip portion of said tensioning element and is slidably engaged in said at least one guide element, in order to tighten said covering element among multiple tensioning positions;

a coupling system, which is configured for removably coupling said traction element to said at least one guide element in a pre-established said tensioning position;

wherein said coupling system is configured to allow the movement of said traction element along said main extension direction in a tensioning direction in which said covering element is progressively tensioned, and to block the movement of said traction element in a loosening direction, opposite said tensioning direction;

wherein said coupling system comprises a first engagement element, fixed to said at least one guide element, and a second engagement element, fixed to said traction element and couplable to said first engagement element in order to constrain said traction element in a pre-established said tensioning position in said at least one guide element;

wherein said first engagement element comprises a plurality of teeth, fixed to said at least one guide element; and wherein said second engagement element comprises at least one flexible tab, fixed to said traction element, which is configured for being snappingly engaged to the teeth of said first engagement element.

2. The support element of claim 1, wherein said at least one guide element is provided with at least one guide channel, which is extended substantially parallel to said main extension direction, and that said traction element comprises at least one guide pin, which projects protrudingly from said traction element, transverse to said main extension direction, and is configured for slidably engaging the at least one guide channel of said at least one guide element in order to guide said traction element along said main extension direction.

3. The support element of claim 2, wherein said traction element is pivoted to said at least one guide element around said at least one guide pin;

the hook of said traction element being placed non-aligned with respect to said at least one guide pin, in order to determine a bending moment on said traction element and maintain said traction element housed in said at least one guide element.

4. The support element of claim 1, wherein the main extension direction of said at least one guide element is rectilinear.

5. The support element of claim 1, wherein the grip portion of said tensioning element is extended starting from a side of said support body, and said main extension direction being orthogonal to said side.

6. The support element of claim 1, wherein said at least one guide element is provided with at least one release opening, in order to allow disengaging said traction element from said at least one guide element.

7. The support element of claim 1, wherein said traction element comprises a hook, and that the grip portion of said tensioning element is engaged with said hook in order to connect said tensioning element to said traction element.

8. The support element of claim 1, wherein said support body is provided with multiple guide wings, which are placed perimetrically on said lower face, and each guide wing defines a respective engagement seat in which at least part of said perimeter portion of said covering element is inserted.

9. A support element for a chair, said support element comprising:

a support body, provided with an upper face and with an opposite lower face;

a covering element, flexible, placed to cover at least the upper face of said support body and provided with a perimeter portion;

a tensioning element, flexible, which is engaged with the perimeter portion of said covering element and is provided with a grip portion, which is susceptible of being stretched in order to tighten said covering element, and is constrained to said support body in order to maintain said covering element taut on said support body;

at least one guide element, which is fixed to the lower face of said support body and is extended along a main extension direction;

a traction element, which is mechanically connected to the grip portion of said tensioning element and is slidably engaged in said at least one guide element, in order to tighten said covering element among multiple tensioning positions;

a coupling system, which is configured for removably coupling said traction element to said at least one guide element in a pre-established said tensioning position;

wherein said at least one guide element is provided with at least one guide channel, which is extended substantially parallel to said main extension direction, and that said traction element comprises at least one guide pin, which projects protrudingly from said traction element, transverse to said main extension direction, and is configured for slidably engaging the at least one guide channel of said at least one guide element in order to guide said traction element along said main extension direction.

10. A support element for a chair, said support element comprising:

a support body, provided with an upper face and with an opposite lower face;

a covering element, flexible, placed to cover at least the upper face of said support body and provided with a perimeter portion;

a tensioning element, flexible, which is engaged with the perimeter portion of said covering element and is provided with a grip portion, which is susceptible of being stretched in order to tighten said covering element, and is constrained to said support body in order to maintain said covering element taut on said support body;

at least one guide element, which is fixed to the lower face of said support body and is extended along a main extension direction;

a traction element, which is mechanically connected to the grip portion of said tensioning element and is slidably engaged in said at least one guide element, in order to tighten said covering element among multiple tensioning positions;

a coupling system, which is configured for removably coupling said traction element to said at least one guide element in a pre-established said tensioning position;

wherein said support body is provided with multiple guide wings, which are placed perimetrically on said lower face, and each guide wing defines a respective engagement seat in which at least part of said perimeter portion of said covering element is inserted.

* * * * *